United States Patent
Satoh et al.

(10) Patent No.: US 6,697,976 B1
(45) Date of Patent: Feb. 24, 2004

(54) PERFORMANCE EVALUATION METHOD, PERFORMANCE EVALUATION SYSTEM, AND INFORMATION STORAGE APPARATUS USING SAME

(75) Inventors: Naoki Satoh, Odawara (JP); Yasuyuki Ito, Chigasaki (JP); Akihiko Hirano, Odawara (JP); Terumi Takashi, Chigasaki (JP); Mikio Suzuki, Odawara (JP)

(73) Assignees: Hitachi, Ltd., Tokyo (JP); Hitachi Video and Information System, Inc., Yokohama (JP)

( * ) Notice: Subject to any disclaimer, the term of this patent is extended or adjusted under 35 U.S.C. 154(b) by 523 days.

(21) Appl. No.: 09/597,272

(22) Filed: Jun. 19, 2000

(30) Foreign Application Priority Data

Jul. 30, 1999 (JP) .......................................... 11-216334

(51) Int. Cl.⁷ .......................... G06F 11/00; H03G 11/04
(52) U.S. Cl. ......................................... 714/704; 360/65
(58) Field of Search ................................ 714/704, 705, 714/706; 371/5.5; 369/53.2; 360/65, 53

(56) References Cited

U.S. PATENT DOCUMENTS

| | | | |
|---|---|---|---|
| 3,774,154 A | 11/1973 | Devore et al. ............... 340/141 |
| 3,868,576 A | 2/1975 | Bagdasarhanz et al. ....... 325/65 |
| 4,541,091 A | * 9/1985 | Nishida et al. .............. 714/756 |
| 5,121,263 A | 6/1992 | Kerwin et al. ................ 360/53 |
| 5,172,381 A | * 12/1992 | Karp et al. .................. 714/775 |
| 5,179,575 A | 1/1993 | Pierce ........................... 375/14 |
| 5,241,546 A | * 8/1993 | Peterson et al. ............. 714/761 |
| 5,274,512 A | 12/1993 | Tanaka et al. ................. 360/65 |
| 5,323,422 A | 6/1994 | Ushirokawa ................. 375/14 |
| 5,341,387 A | 8/1994 | Nguyen ....................... 714/788 |
| 5,363,411 A | 11/1994 | Furuya et al. ................. 375/75 |
| 5,383,183 A | 1/1995 | Yoshida ..................... 370/60.1 |
| 5,414,571 A | 5/1995 | Matsushige et al. .......... 360/65 |
| 5,422,760 A | 6/1995 | Abbott et al. ................. 360/46 |
| 5,432,794 A | 7/1995 | Yaguchi ....................... 714/708 |

(List continued on next page.)

FOREIGN PATENT DOCUMENTS

| | | | |
|---|---|---|---|
| EP | 426353 B1 | 7/1995 | ........... G11B/20/18 |
| GB | 2310981 | 9/1997 | ........... H04L/25/03 |
| GB | 2344730 | 6/2000 | ........... H04L/25/03 |
| JP | 3144969 | 6/1991 | ........... G11B/20/18 |
| JP | 4121803 | 4/1992 | ........... G11B/5/09 |
| JP | 5060374 | 3/1993 | ........... G11B/20/10 |
| JP | 5063734 | 3/1993 | ........... H04L/12/56 |
| JP | 5120798 | 5/1993 | ........... G11B/20/10 |
| JP | 7264101 | 10/1995 | ........... G11B/5/09 |
| JP | 7296529 | 11/1995 | |
| JP | 9007300 | 1/1997 | ........... G11B/20/10 |
| JP | 9245435 | 9/1997 | ........... G11B/5/35 |
| JP | 2000298835 | 10/2000 | ........... G11B/7/00 |

OTHER PUBLICATIONS

J. D. Coker, "Implementation of PRML in a Rigid Disk Drive", IEEE Transactions of Magnetics, vol. 27, No. 6, Nov. 1991, pp. 4538–4543.

Primary Examiner—Albert Decady
Assistant Examiner—Esaw Abraham
(74) Attorney, Agent, or Firm—Antonelli, Terry, Stout & Kraus, LLP

(57) ABSTRACT

Data byte errors are detected by a comparator and classified into errors for respective interleaves, and the classified errors are counted by counters in an error count block. Further, at the time one sector has been read, comparators compare the counted values for the respective interleaves with an interleave threshold to detect whether nor not there are interleaves which have a number of errors exceeding the interleave threshold, and the detected results are counted by an error count block. The frequency of retries after an ECC is predicted from the counted value on the error count block and the total number of read sectors.

6 Claims, 11 Drawing Sheets

U.S. PATENT DOCUMENTS

| | | | |
|---|---|---|---|
| 5,585,974 A | 12/1996 | Shrinkle | 360/46 |
| 5,588,011 A | 12/1996 | Riggle | 714/795 |
| 5,610,776 A | 3/1997 | Oh | 360/53 |
| 5,631,909 A * | 5/1997 | Weng et al. | 714/704 |
| 5,745,315 A | 4/1998 | Aoyama | 360/65 |
| 5,761,212 A | 6/1998 | Foland, Jr. et al. | 714/724 |
| 5,764,651 A * | 6/1998 | Bullock et al. | 714/708 |
| 5,787,118 A | 7/1998 | Ueda | 375/232 |
| 5,802,118 A * | 9/1998 | Bliss et al. | 375/350 |
| 5,954,837 A | 9/1999 | Kim | 714/795 |
| 5,987,634 A * | 11/1999 | Behrens et al. | 714/719 |
| 6,003,051 A | 12/1999 | Okazaki | 708/3 |
| 6,035,427 A * | 3/2000 | Kweon | 714/702 |
| 6,046,873 A | 4/2000 | Hori et al. | 360/53 |
| 6,078,614 A | 6/2000 | Brown et al. | 375/232 |
| 6,124,997 A | 9/2000 | Hirasaka | 360/65 |
| 6,175,460 B1 | 1/2001 | Hori et al. | 360/53 |
| 6,285,520 B1 | 9/2001 | Makiura et al. | 360/65 |
| 6,313,961 B1 | 11/2001 | Armstrong et al. | 360/46 |
| 6,404,570 B1 | 6/2002 | McNeil et al. | 360/31 |
| 6,449,110 B1 | 9/2002 | DeGroat et al. | 360/46 |
| 6,449,231 B1 * | 9/2002 | Numata | 369/53.2 |
| 6,493,165 B1 | 12/2002 | Satoh et al. | 360/65 |
| 6,496,316 B1 | 12/2002 | Hori et al. | 360/65 |
| 6,577,461 B2 | 6/2003 | Satoh et al. | 360/46 |

\* cited by examiner

PERFORMANCE EVALUATION METHOD, PERFORMANCE EVALUATION SYSTEM, AND INFORMATION STORAGE APPARATUS USING SAME

CROSS-REFERENCE TO RELATED APPLICATIONS

This application is related to U.S. application Ser. No. 08/529,400, filed on Sep. 18, 1995, now U.S. Pat. No. 6,046,873, the content of which is incorporated herein by reference in its entirety.

This application is related to U.S. application Ser. No. 09/406,920, filed Sep. 28, 1999, now U.S. Pat. No. 6,493,165, the content of which is incorporated herein by reference in its entirety.

BACKGROUND OF THE INVENTION

The present invention relates to a performance evaluation system and a performance evaluation method which can accurately estimate an event sector error rate after error correction in a performance evaluation for a high performance channel that contains a parity code, an MTR (Maximum Transition Recording) code, and so on, and an information storage apparatus using same.

FIG. 10 shows a graph which evaluates the dependency of an event error rate on the number of errors within one sector (512 bytes) in data sectors using a read/write channel code which has been developed for recent harddisk drives. Three types of codes (codes 1–3) are used in the evaluation. While any of the codes exhibits a reduced event error rate as the number of errors increases, the degree of reduction differs from one code to another. Also, although not shown, the three codes differ in the event error frequency (generally corresponding to BER (byte error rate), later described) of 1–2 bytes, which exhibits the highest error frequency.

The BER is evaluated by multiplying the event error rate by the number of errors at each number of errors and summing the resulting products, i.e., by integrating a curve representing the error number dependency as shown in FIG. 10. As the sum is smaller, the BER is evaluated as better. For calculating this value for each code, (3E−03×1+4E−03×2)/512=3E−05 for the code 1 (the division by 512 is performed to find the number of errors in one sector (512 bytes)). Similarly, (3E−02×1+4E−02×2)/512=2E−04 for the code 2, and (3E−02×1+1E−02×2)/512=1E−04 for the code 3. The results demonstrate the code 1 as the best code in terms of BER. However, the code 3 is the best in evaluation of EER (Event Error Rate) when the number of errors per sector exceeds 3 bytes.

Since actual harddisk drives comprise respective error correcting circuits (ECC) behind a R/W channel, the criteria of selecting the best code may vary depending on the correction capabilities of particular ECCs. Generally, it is estimated that the code 1 is more effective when an employed ECC has a poor correction capability, while the code 3 is effective when an employed ECC has a high correction capability. More specifically, however, it is thought that since errors can appear in a number of different manners in one sector, even the same number of errors may not be corrected occasionally by a particular EEC depending on how the errors appear in a sector.

With the ECC, NRZ read data is interleaved to limit the data length per interleave within 255 bytes. The number of interleaves for the ECC currently applied to harddisk drives is generally three or four, so that the number of hardware correctable bytes per interleave is approximately four or five. If the number of hardware correctable bytes per interleave is exceeded in any of interleaves, a retry (re-read operation) occurs due to the inability of hardware correction. A retry results in an inevitable loss of time required to rotate a magnetic disk once and accordingly lower performance of the drive.

FIGS. 11A to 11C show examples of error generation patterns when seven bytes of errors occur in a three-interleave scheme. When errors are successive in NRZ read data as shown in FIG. 11A, all the errors will not concentrate in a single interleave. However, when errors occur at a plurality of separate positions as shown in FIGS. 11B and 11C, the errors are susceptible to concentration in a data interleave 1 (DI-1). When errors occur highly frequently as shown in FIG. 11C, an ECC is required to have the error correction capability of 7 bytes per interleave.

SUMMARY OF THE INVENTION

It will be appreciated from the foregoing discussion that the conventional evaluation based on BER or the number of errors in one sector cannot provide the most effective code after an ECC or a detailed configuration of the ECC (a required number of bytes corrected thereby, the number of interleaves, and so on). For this reason, the conventional performance evaluation including the configuration of the ECC cannot but relying on a system level evaluation. However, the coding technology has been remarkably advanced in recent years together with the development of LSI miniaturizing processes, and therefore an erroneous determination is likely to be made unless rapid and appropriate evaluation is made.

A recently developed GCR (Group Coded Recording)+parity code or the like, described in "A New Target Response with Parity Coding for High Density Magnetic Recording Channels," IEEE TRANSACTION ON MAGNETICS, vol. 34, No. 4, July 1998 does improve the BER because of the correction capability possessed by the code itself, but has a concern for the influence on the ECC due to possible erroneous corrections. On the other hand, an MTR (Maximum Transition Recording) code or the like described in "Maximum Transition Run Codes for Data Storage Systems," IEEE TRANSACTION ON MAGNETICS, Vol. 32, No. 5, September 1996, defines the number of maximum successive magnetization. The MTR code, although providing little improvement on BER, is characterized by its immunity to the influence of disk noise and so on and less susceptibility to long errors because the number of successive magnetization is defined. Other than the foregoing, the development of new codes has been rapidly advanced, such as applications of a turbo code, which has been brought into practice in the field of communications, and so on. Thus, rapid evaluation on the performance of systems with such new codes, including the effect of the ECC, has become extremely important for the development of systems.

To achieve the above object, the present invention provides a performance evaluation method for use in data processing after decoding of data, comprising the steps of setting the number of interleaves (Ni), and a threshold (Th) for the number of errors per interleave, interleaving detected errors, counting the interleaved errors in a data sector for each interleave, and counting the number of times the counted number of interleaved errors exceeds the threshold in each data sector.

The present invention also provides a performance evaluation system which comprises error detecting means for comparing user data stored in a memory with read data outputted from a read/write channel to detect errors, error interleaving means for interleaving errors detected by the error detecting means, first counting means for counting the errors, and second counting means for counting the number of times a counted value on the first counting means exceeds a set threshold.

The present invention further provides an information storage apparatus which has an information storage medium, a head for reading/writing information from/on the information storage medium, an actuator for moving the head over the information storage medium, amplifying means for amplifying a read waveform read by the head, and signal processing means for decoding from the read waveform. The information storage apparatus also comprises error detecting means for comparing read data outputted from the signal processing unit with user data stored in a memory to detect errors, error interleaving means for interleaving errors detected by the error detecting means, first counting means for counting errors interleaved by the error interleaving means, setting means for setting a threshold for the number of errors per interleave, and second counting means for counting the number of times a counted value on the first counting means exceeds the threshold.

DESCRIPTION OF THE EMBODIMENTS

Figure 6:
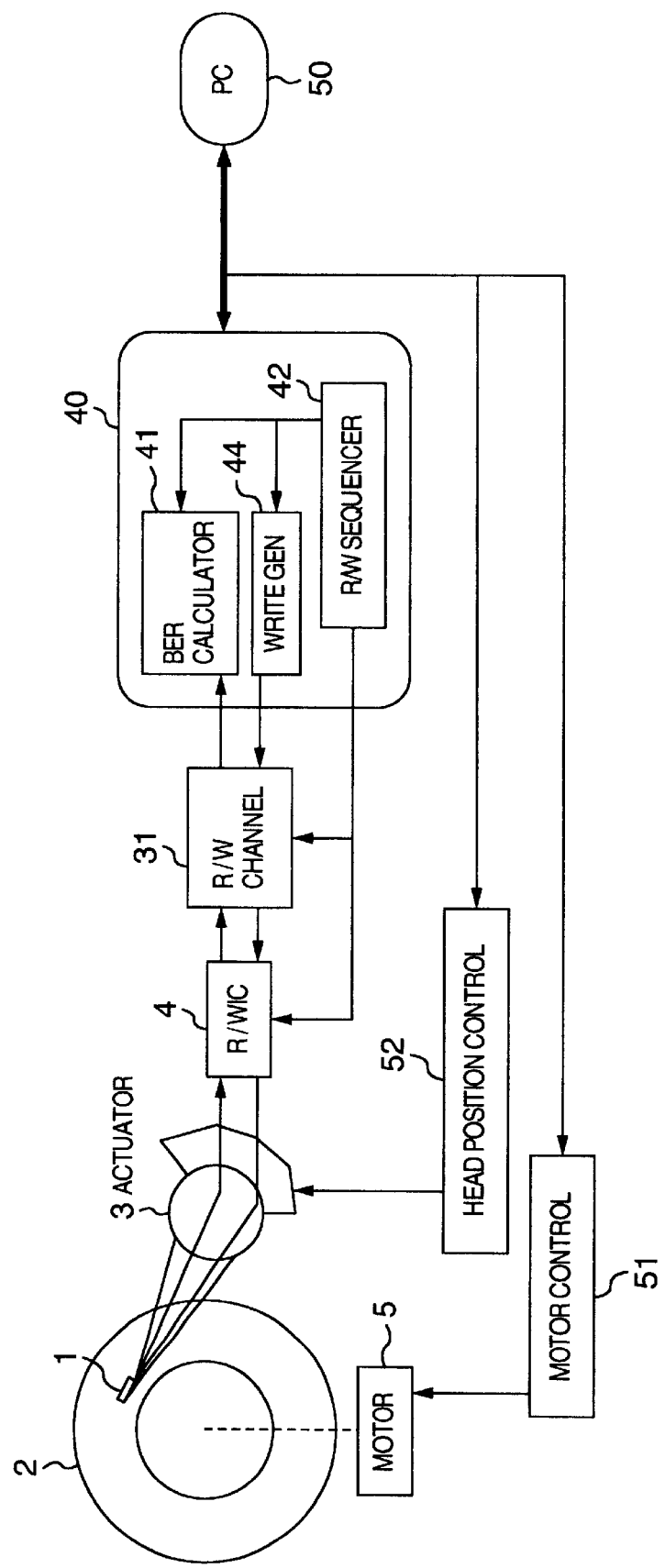
FIG. 6 is a block diagram illustrating the configuration of a read/write evaluation system for harddisk drives.

FIG. 6 illustrates an exemplary configuration of a read/write evaluation system for harddisk drives. The read/write evaluation system comprises a magnetic disk 2 serving as an information storage medium; a magnetic head 1 for reading/writing information from/on the magnetic disk 2; an actuator 3 for moving the magnetic head 1 to a writing position on the magnetic disk 2; an R/W IC 4 which is a means attached near the actuator 3 for amplifying an analog read waveform read by the magnetic head 1; a spindle motor 4 for rotating the magnetic disk 2; a read/write channel (R/W channel) 31 serving as a signaling means for decoding bytes from an analog read waveform; and an error analyzer 40 serving as a performance evaluation unit.

The error analyzer 40 comprises a BER (Byte Error Rate) calculator 41; a read/write sequencer (R/W sequencer) 42; and a FPGA (Field Programmable Gate Array) having a write data generator (write gen.) 44 as a function. Programs for defining functions of the error analyzer 40 are set by a PC (personal computer) 50 connected thereto. The actuator 3 is controlled by a head position controller 52 through the PC 53, while the motor 5 is controlled by a motor controller 51 through the PC 50.

Now, an overview will be given to the configuration and operation of the BER calculator 41.

Figure 7:
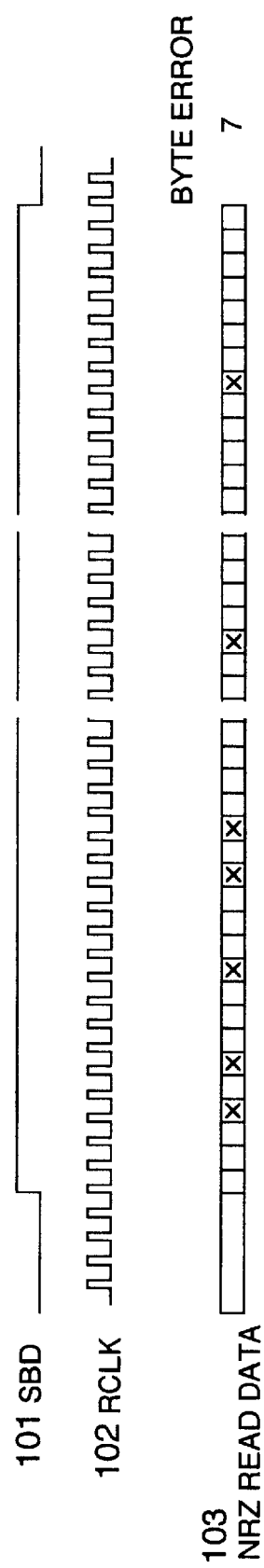
FIG. 7 is a diagram for explaining the operation of the read/write evaluation system for harddisk drives.

As illustrated in FIG. 7, the read/write channel 31 outputs read data (NRZ read data) 103, a clock (RCLK) 102 synchronized with the read data (NRZ read data) 103, and SBD (Sync Byte Detect) 101 indicative of the head of user data.

Figure 8:
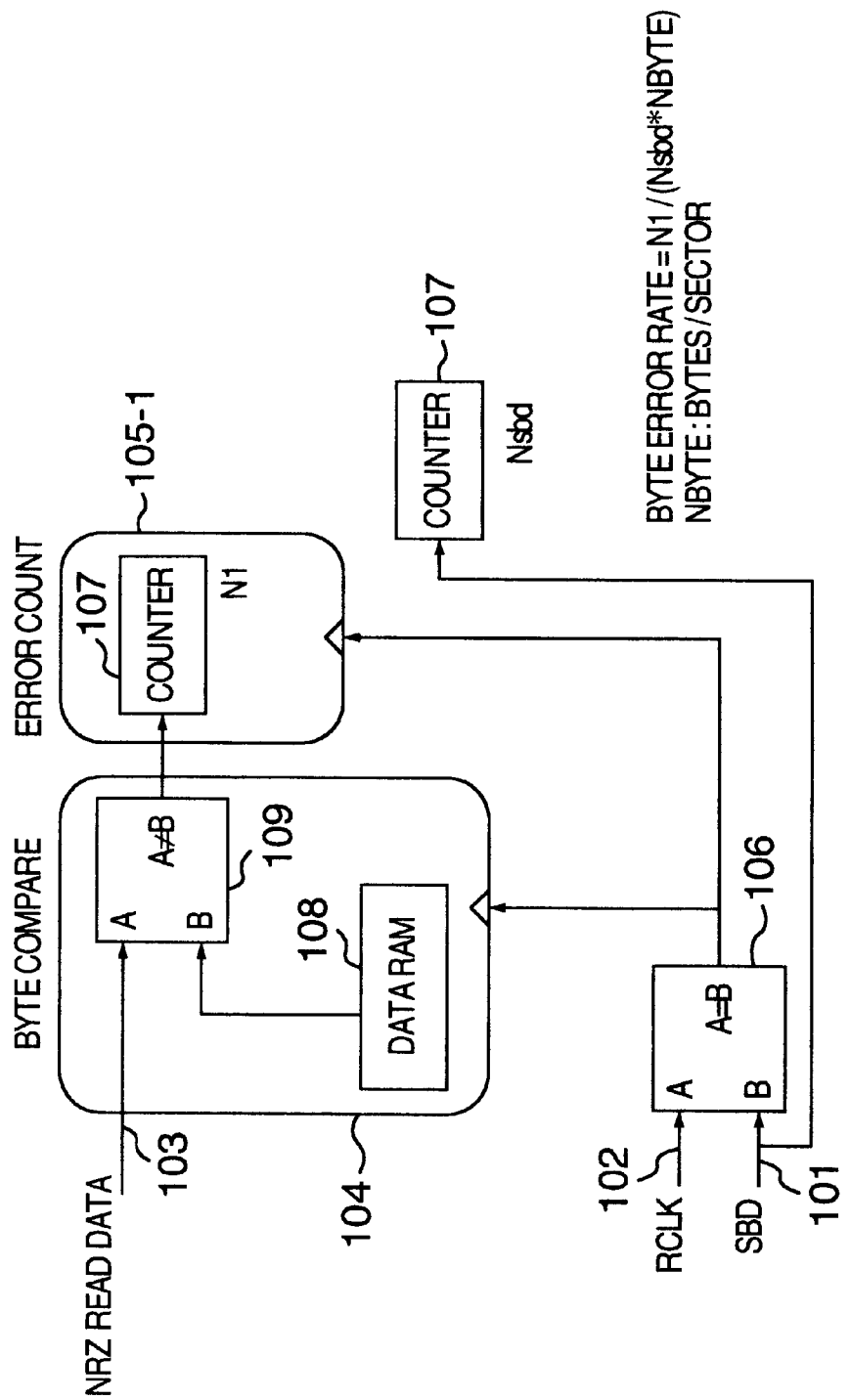
FIG. 8 is a block diagram illustrating the specific configuration of a BER calculator.

FIG. 8 illustrates the specific configuration of the BER calculator 41. In the BER calculator 41, a byte comparator 109 compares written user data with data stored in a data RAM 108, and forces a counter 107 in an error count block 105-1 to count up when a match does not result. Simultaneously, the number of SBD 101 is counted by a SBD counter 107.

Assuming that a counted value on the error count block 105-1 is N1, a counted value on the SBD counter 107 is N sbd, and the number of data bytes per data sector is N bytes, the byte error rate (BER) is calculated as follows:

$$BER=N1/(Nsbd \times N \text{ bytes})$$

Figure 9:
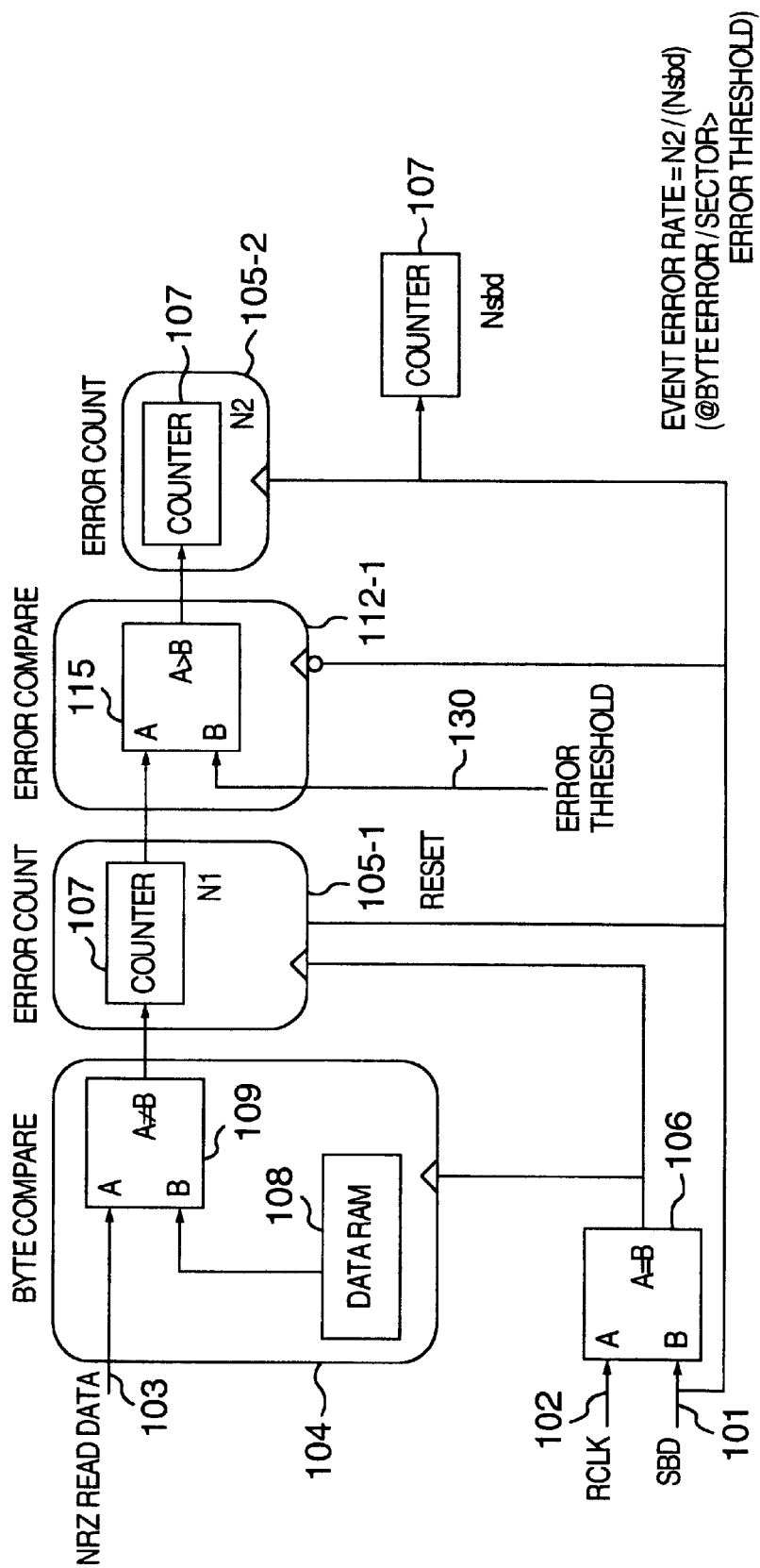
FIG. 9 is a block diagram illustrating an extended configuration of the BER calculator.

FIG. 9 illustrates an extended version of the BER calculator 41. Generally, the illustrated calculator counts the number of sectors which have the number of errors exceeding a threshold set by a setting means (not shown). Specifically, in FIG. 9, a counted value N1 on an error count block 105-1 is compared with an error threshold 130 by an error compare block 112-1 including a comparator 115 as compare means at a falling edge of the SBD 101. When the number of errors N1 measured in a data sector exceeds the error threshold 130, the error count block 105-2 counts up, and a counter 107 in the previous error count block 105-1 is reset at a rising edge of the SBD 101.

Assuming that the counted value on the error count block 105-2 is N2 and a counted value on the SBD counter 107 is N sbd, an event error rate (Event Error Rate: EER) of a sector having the number of errors exceeding the error threshold 130 is calculated by:

$$EER=N2/(N\ sbd)$$

By the use of this function, it is possible to evaluate the dependency of the error rate in a data sector on the number of errors in the data sector.

Figure 1:
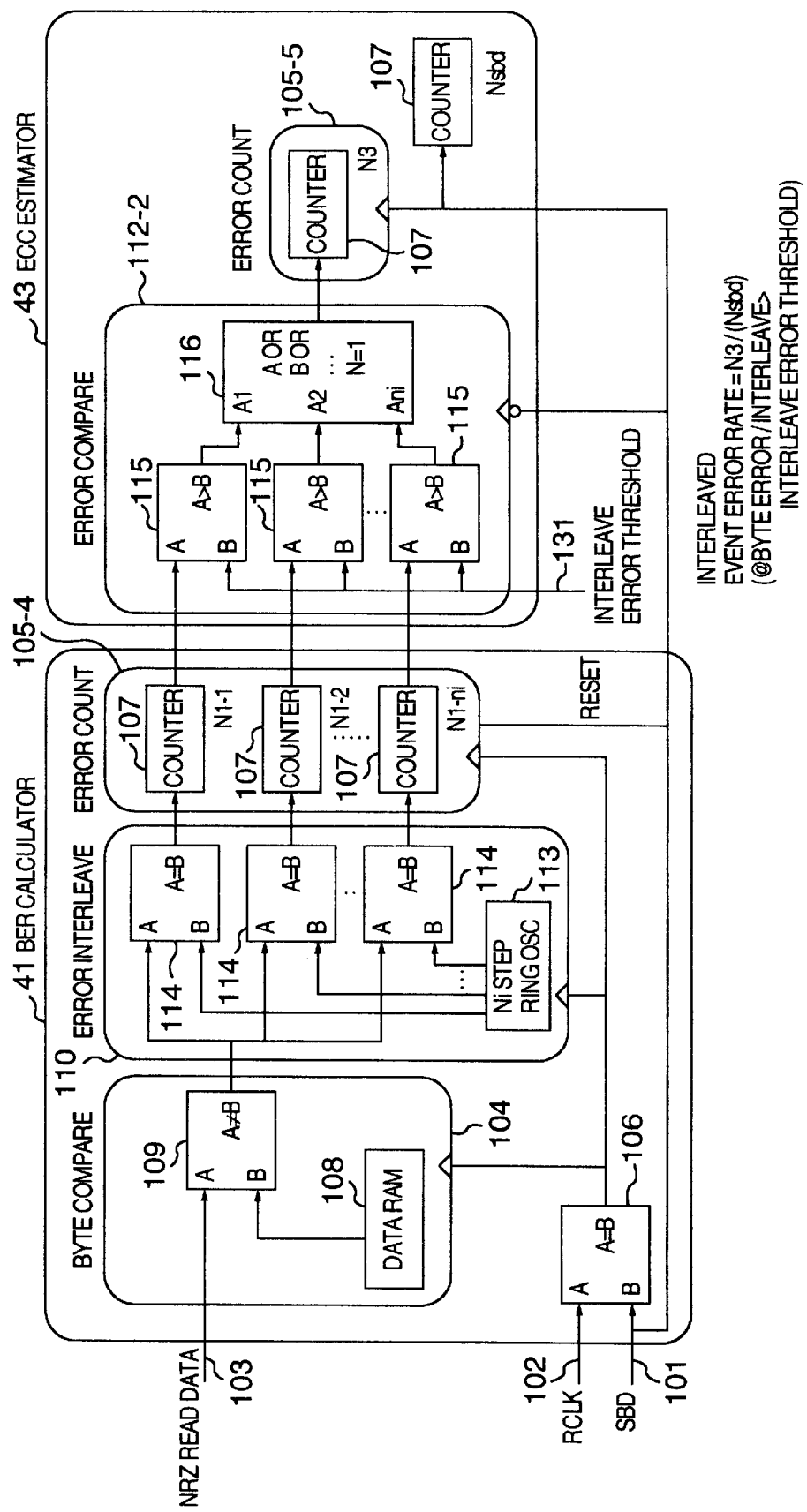
FIG. 1 is a block diagram illustrating the configuration of an error analyzer according to an embodiment of the present invention.

FIG. 1 illustrates the configuration of an error analyzer 40 to which the present invention is applied. As previously explained with reference to FIG. 7, a read/write channel 31 outputs read data 103, a clock (RCLK) 102 synchronized with the read data 103, and SBD (Sync Byte Detect) 101 indicative of the head of user data. In a byte compare block 104 of a BER calculator 41, a comparator 109 which serves as error detecting means compares data from a data RAM 108, which is a memory for storing written user data, with read data 103 to detect error bytes.

Detected errors are classified into errors for each interleave by Ni step Ring OSC 113 and an AND gate 114, which serve as a distributing means in an error interleave means (error interleave block) 110, and a subsequent counter 107 (a first counter) in an error count block 105-4 is forced to count up. Here, Ni corresponds to the number of interleaves for an ECC which has been set by a setting means (not shown). Also, the counter 107 in the error count block 105-4 is reset at a rising edge of the SBD 101.

Further, in a subsequent ECC estimator 43, comparators 115 in the error compare block 112-2 compare counted values (N1-1–N1-ni) associated with respective interleaves with an interleave error threshold 131 at the time the SBD 101 is closed, and a logical OR gate 116 detects whether or not any interleave presents a counted value (N1-1–N1-ni) exceeding the interleave error threshold 131. Then, the detection result is used to count up a counter 107 (a second counter) in an error count block 105-5. Simultaneously with these operations, an SBD counter 107 also counts the number of SBD 101.

Assuming that a counted value on the error count block 105-5 in the ECC estimator 43 is N3, and a counted value on the SBD counter 107 is Nsbd, an interleaved event error rate (IEER) exceeding the interleave error threshold 131 is calculated by:

$$IEER = N3/Nsbd$$

This IEER corresponds to the frequency of retries for the number of read sectors with an estimated ECC.

Thus, by evaluating IEER, it is possible to determine an optimal number of interleaves for an ECC to be applied, and the number of correction bytes per interleave before applying the ECC to make evaluation in an actual system or the like.

It should be noted that if the counted values N1-1–N1-ni on the counters 107 in the BER calculator 41 are accumulated by another counter before they are reset at a rising edge of the SBD 101, BER (byte error rate) can be simultaneously evaluated. Also, if the number of interleaves Ni is set to one, the number of errors in one sector can be evaluated as has been done in the conventional evaluation.

Figure 2:
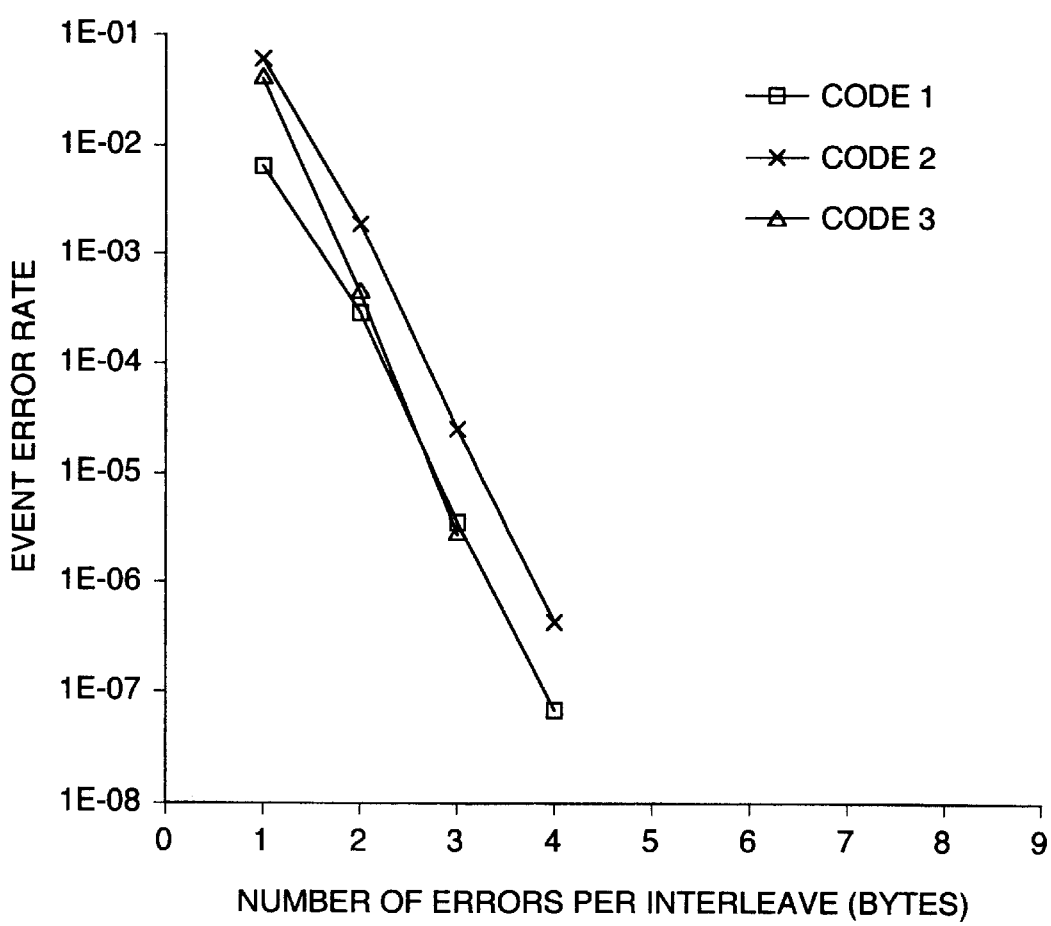
FIG. 2 is a graph showing the results of evaluation on each code which was made using the error analyzer according to the embodiment of the present invention.
Figure 10:
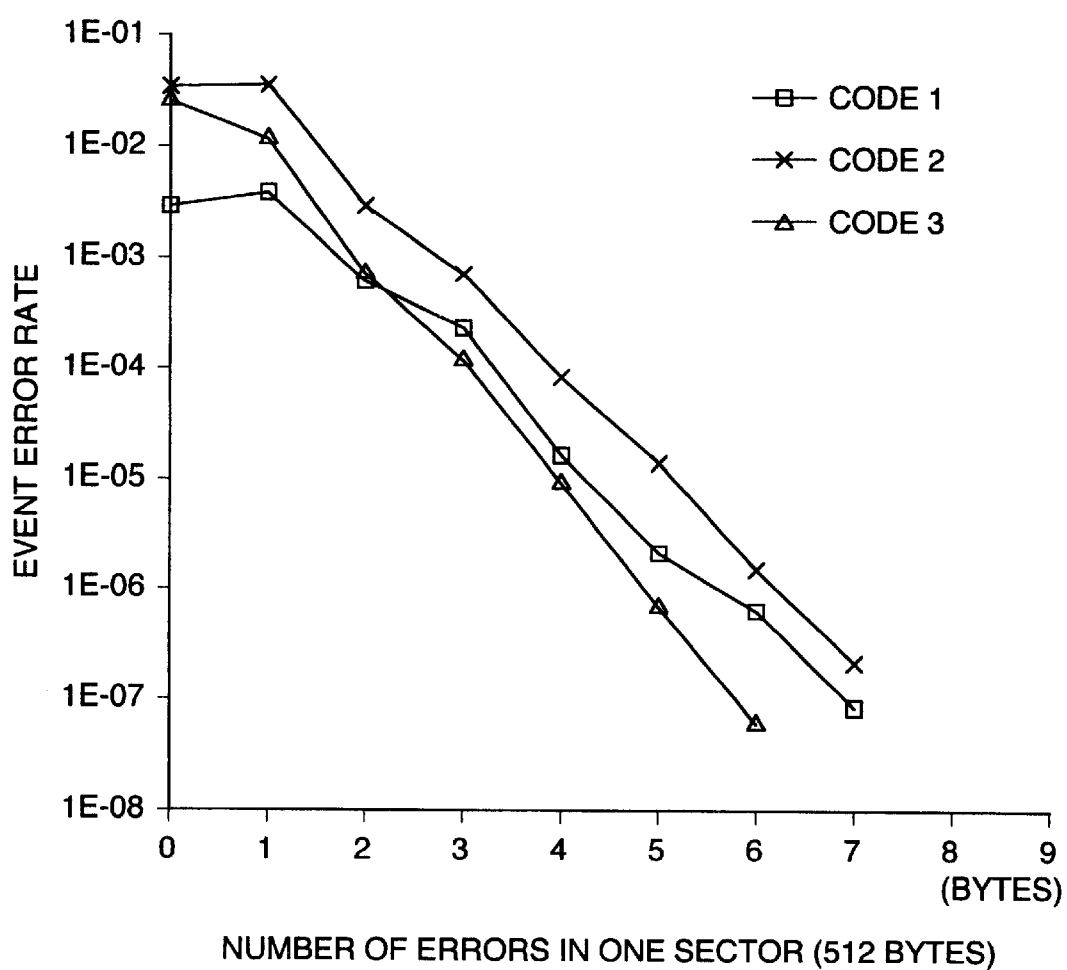
FIG. 10 is a graph showing the results of comparison among several codes which has been made by a conventional error analyzer with respect to the code performance.
Figure 11A:
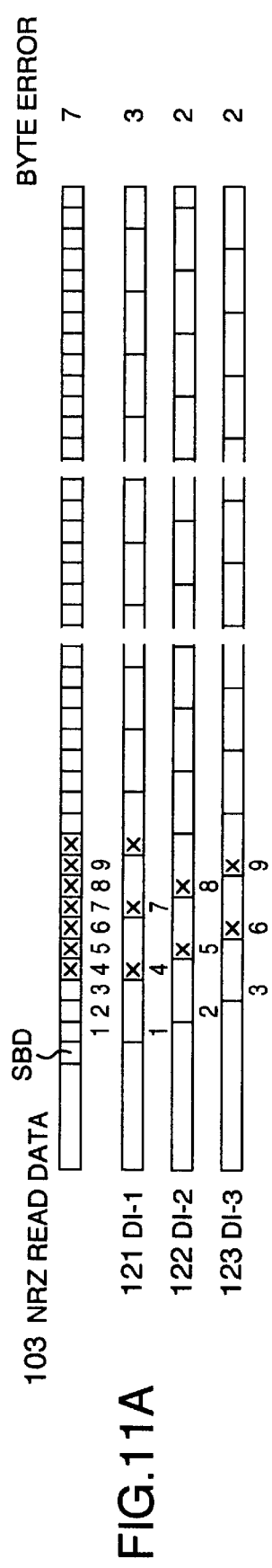
FIGS. 11A to 11C are diagrams illustrating examples of error occurring patterns when seven bytes of errors occur.
Figure 11B:
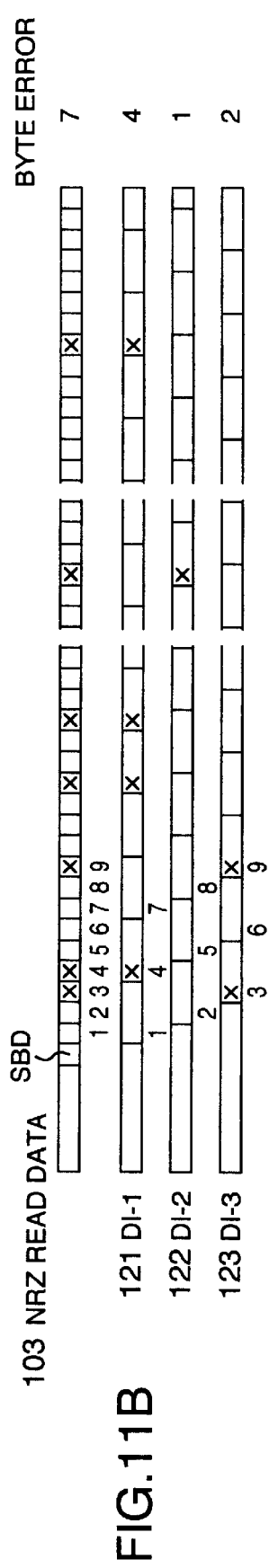
Figure 11C:
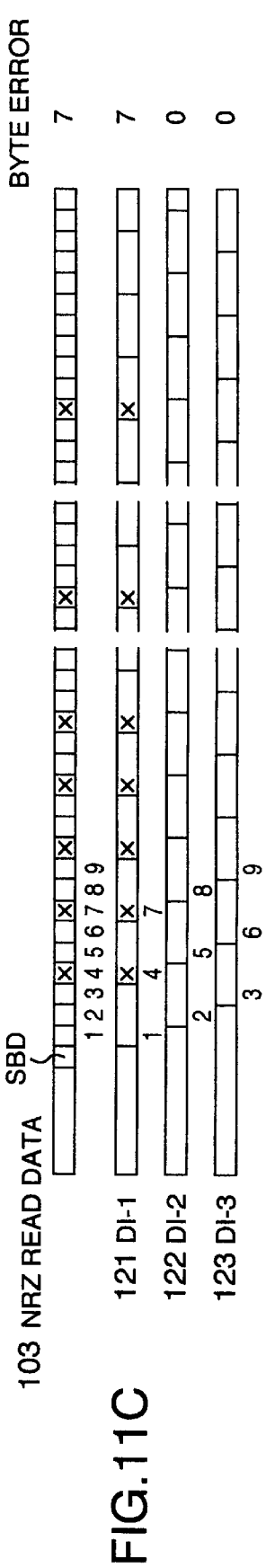

In the configuration of this embodiment, three types of codes having characteristics as shown in FIG. 10 were evaluated in the three-interleave scheme. The results of the evaluation are shown in FIG. 2. The horizontal axis, unlike FIG. 10, represents the number of errors per interleave, while the vertical axis represents the event error rate of a sector similarly to FIG. 10.

Among the respective evaluated codes, the rate of a decrease in the event error rate to an increase in the number of errors (the degree of slope of the lines) is two figures or less per byte for the code 1 and code 2, and two figures or more per byte for the code 3. Also, for the number of errors equal to or more than three bytes, the code 3 exhibits the lowest event error rate (although FIG. 2 does not show the event error rate for the code 3 at the number of errors equal to four, the rate decreases by two figures or more, and therefore the code 3 will present a value smaller than that of the code 1 when the number of errors is four). In other words, it is understood that when the number of bytes (the number of errors) corrected by an applied ECC per interleave is three or more, the selection of the code 3 will result in a minimum error frequency after the ECC.

Thus, the code 3 and an ECC which is expected to have the correction capability equal to or higher than three bytes per interleave may be employed for applying to a harddisk drive. Though not shown herein, the employment of an appropriate ECC may be considered by varying the number of interleaves, in which case a combination of the number of interleaves and an ECC length, which requires the least amount of added data, may be selected as the ECC.

Figure 3:
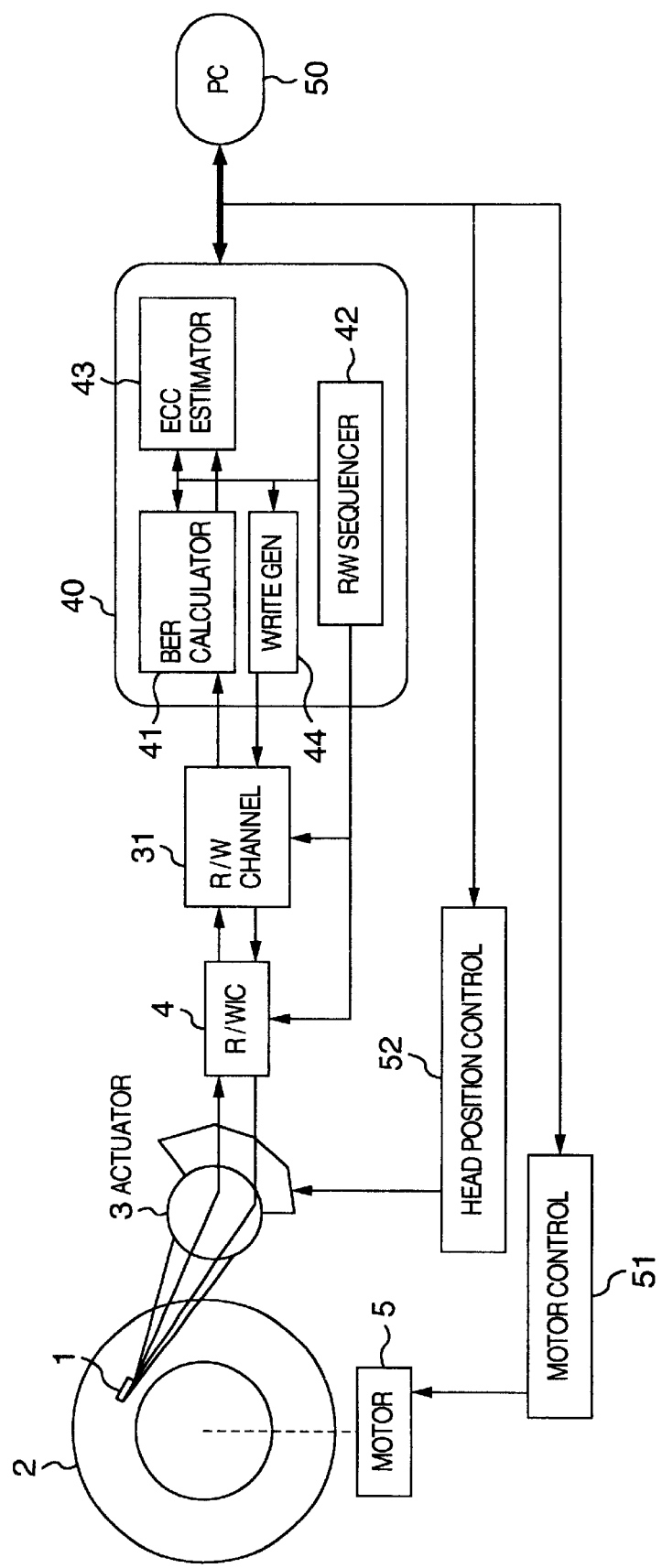
FIG. 3 is a block diagram illustrating the configuration of a read/write evaluation system for harddisk drives according to another embodiment of the present invention.

FIG. 3 illustrates an embodiment in which the present invention is applied to a read/write evaluation system for a harddisk drive. The read/write evaluation system comprises a magnetic disk 2; a magnetic head 1; an actuator 3; an R/W IC 4 attached near the actuator 3; a spindle motor 5; a read/write channel (R/W channel) 31; an error analyzer 40 comprised of FPGA (Field Programmable Gate Array). Here, the error analyzer 40 comprises a BER (Byte Error Rate) calculator 41; a read/write sequencer (R/W sequencer) 42; an ECC estimator 43 as shown in the first embodiment; and a write data generator (Write gen.) 44. Programs for defining functions of the error analyzer 40 are set by a PC (personal computer) 50 connected thereto. The actuator 3 is controlled by a head position controller 52 through the PC 50, while the motor 5 is controlled by a motor controller 51 through the PC 50.

According to this embodiment, the evaluation provided by the read/write evaluation system can be relied on to determine which functions an appropriate ECC should have for a replacement of the magnetic head 1 and/or a magnetic disk 2, or for a change in the R/W channel 31, or how high the retry frequency will reach when a certain ECC function is specified, and so on. In addition, the read/write evaluation system can readily evaluate characteristics indicating a reduced error rate (bucket curve, off-track margin, etc.) when the magnetic head 1 is offset in the track width direction.

Figure 4:
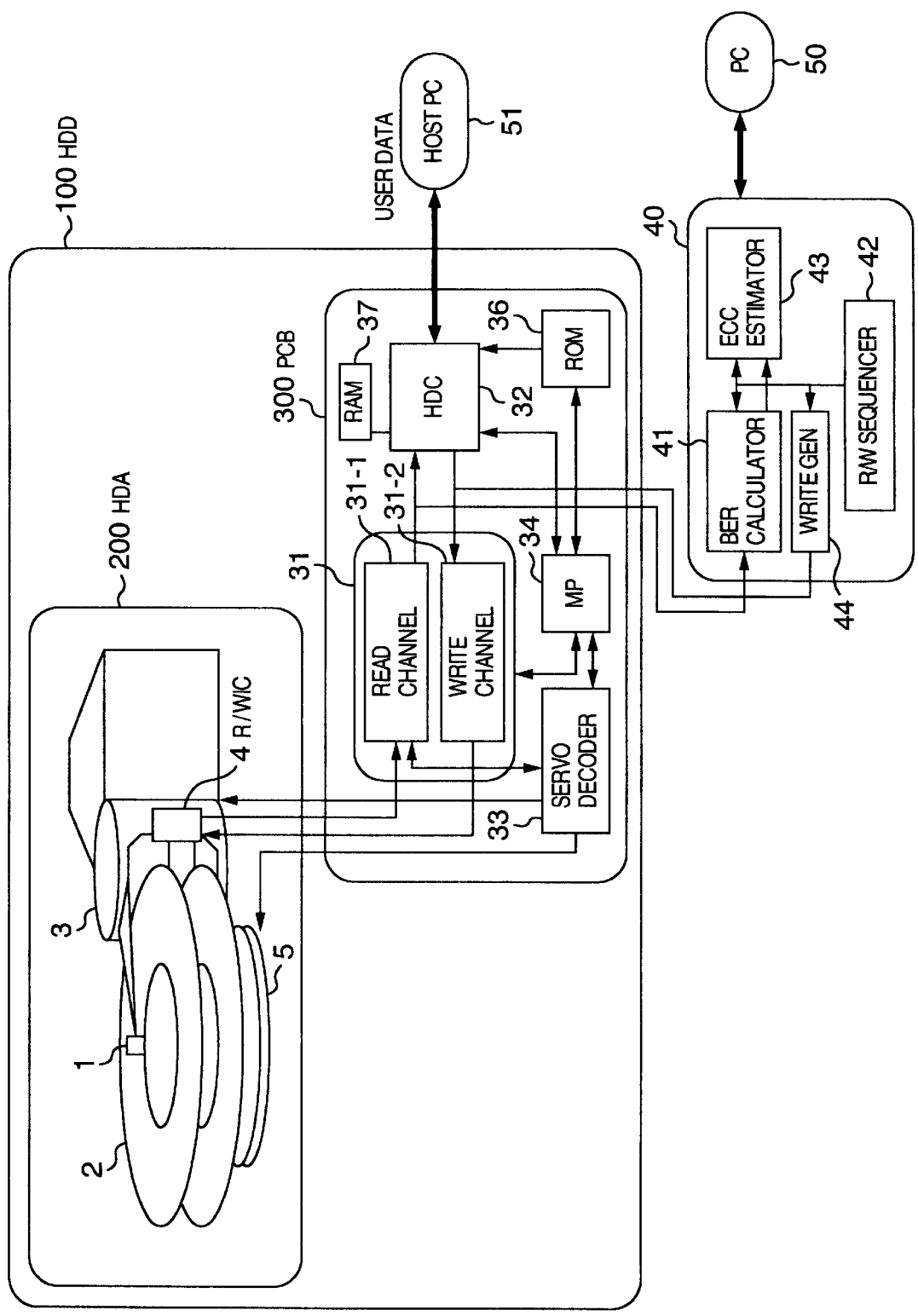
FIG. 4 is a block diagram illustrating an embodiment in which the error analyzer is applied to a harddisk drive.

FIG. 4 illustrate an embodiment in which the error analyzer 40 is applied to a harddisk drive (HDD) 100. The HDD 100 comprises a head assembly (HDA) 200 including a magnetic disk 2, a magnetic head 1, an actuator 3, an R/W IC 4 mounted on the actuator 3, a spindle motor 5 and so on; and a package board (PCB) 300 including a read/write channel 31, a harddisk controller chip (HDC) 32, a servo decoder 33, a microprocessor (MP) 34, a ROM 36, a RAM 37, and so on. The error analyzer 40 is connected between the R/W channel 31 and the HDC 32. The error analyzer 40 controls the R/W channel and the R/W IC related to read/write of data, while a servo-related control is performed using associated functions of the HDD 100. The configuration of the error analyzer 40 is identical to that of the first embodiment illustrated in FIG. 1.

According to this embodiment, even if the HDC 32 has any functional failure, an ECC operation in the HDC 32 can be simulated on the actual HDD 100 to evaluate the error rate.

Also, the evaluation result provided by the error analyzer 40 may be compared with the result of evaluation on the HDC 32 in operation to predict the presence or absence of any functional failure at sites within the HDC 32 including the ECC, and the effect expected by changing the HDC (ECC).

Further, effective improvements resulting from a new magnetic head 1 and/or magnetic disk 2 scheduled for implementation in the next apparatus or HDD can be evaluated using a mechanical system and a circuit system of the former HDD in which the magnetic head 1 and/or magnetic disk 2 are replaced, as they are, without relying on an expensive read/write evaluation system. This can also promote the development of systems.

Figure 5:
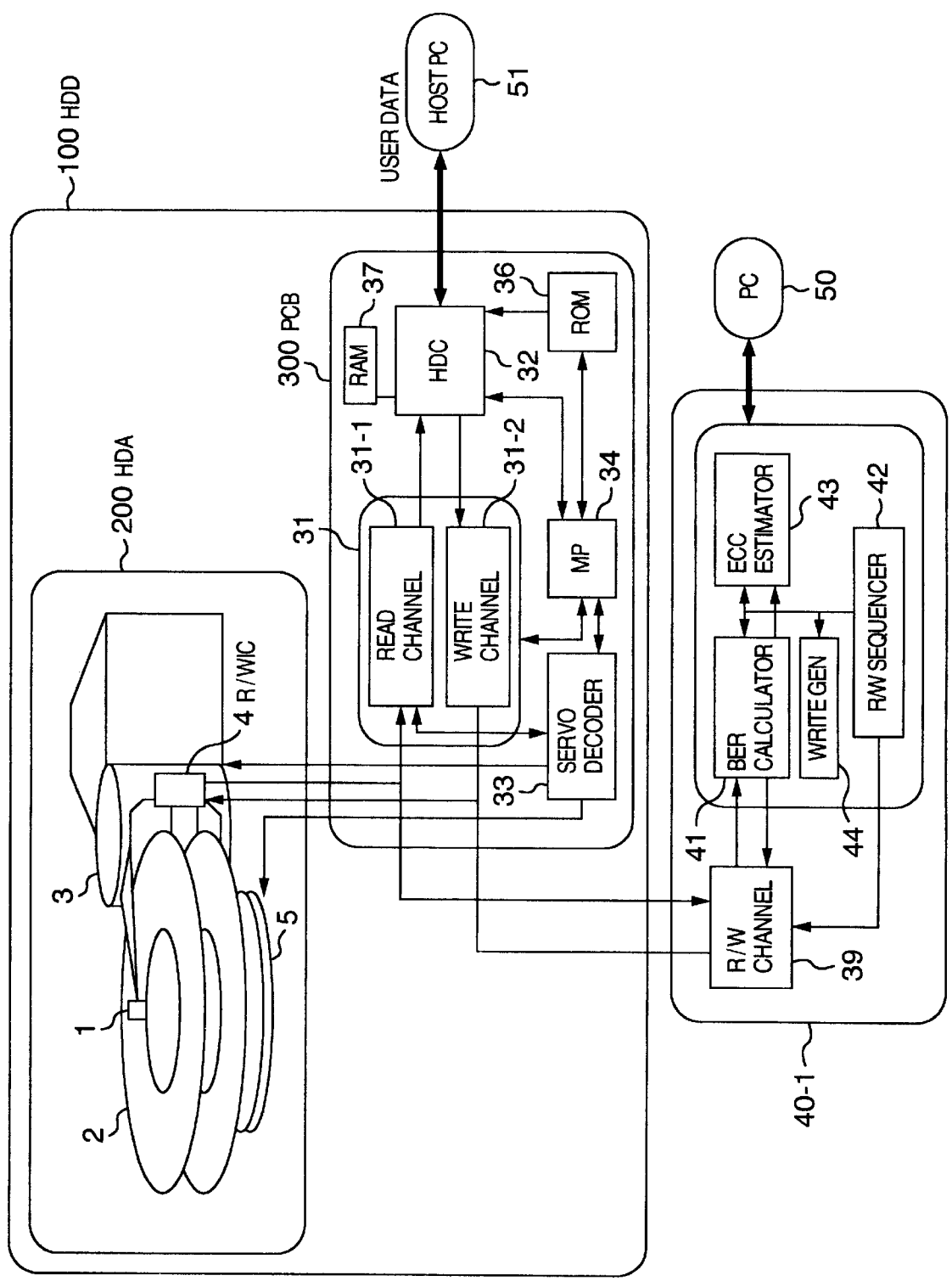
FIG. 5 is a block diagram illustrating another embodiment in which the error analyzer is applied to a harddisk drive.

FIG. 5 illustrates an embodiment in which the error analyzer 40 is applied to the HDD 100. This embodiment differs from that of FIG. 4 in that a R/W channel 39 related to data read/write is additionally provided external to the HDD 100. The configuration of the error analyzer 40 is identical to that of the first embodiment illustrated in FIG. 1. A servo-related control is performed using associated functions of the HDD 100.

According to this embodiment, in addition to the effect provided by the embodiment of FIG. 4, the effect resulting from a change in the R/W channel 39 can be confirmed, so that the evaluation on function and performance for a code of the R/W channel 39 and so on can be readily accomplished in combination of the error analyzer 40 which simulates ECC functions.

It should be noted that the error analyzer 40 according to the present invention may be incorporated in the R/W channel 31 of the actual HDD 100. In this case, although a large circuit scale of the data RAM 108 in the BER calculator 41 illustrated in FIG. 1 is an impediment to the incorporation, the error analyzer 40 can be implemented even with a less capacity of data RAM in combination with a data scramble function in the R/W channel 31.

While the foregoing embodiments have been described for error detection in units of bytes, the error detection can be readily implemented likewise in units of words.

Further, while the foregoing embodiments have been described in connection with harddisk drives, it is apparent that the present invention can be applied to different types of information storage apparatus using a magneto-optical disk, an optical disk or the like.

What is claimed is:

1. A performance evaluation method for use in data processing with error correction code after decoding of data, comprising the steps of:

setting two or more interleaves in read data of one sector, and setting a number of errors per each of said interleaves;

interleaving detected errors;

counting errors per each of said interleaves in said read data of one sector; and counting a number of instances in which the counted errors per each of said interleaves exceeds said set number of errors per each of said interleaves in said read data of one sector.

2. A performance evaluation system comprising:

an error detector circuit for comparing user data stored in a memory with read data accompanied with an error correction code output from a read/write channel to detect errors;

an error interleaver for interleaving errors detected by said error detector circuit in two or more interleaves;

a first counter for counting said errors per each of said interleaves; and a second counter for counting a number of instances in which the counted errors per each of said interleaves exceeds a predetermined threshold number.

3. A performance evaluation system according to claim 2, further comprising:

a memory for storing said user data;

a distribution circuit for distributing errors detected by said error detector circuit into respective interleaves; and a setting circuit for setting said threshold number per each of said interleaves, wherein said error interleaver interleaves errors distributed by said distribution circuit, wherein said first counter counts errors interleaved by said error interleaver in a sector of said read data of one sector, and wherein said second counter counts a number of instances in which the counted errors per each of said interleaves exceeds said threshold number for each of said read data of one sector.

4. A performance evaluation system comprising:

an error detector circuit for comparing user data stored in a memory with read data output from a read/write channel to detect errors;

an error interleaver for interleaving errors detected by said error detector circuit;

a first counter for counting said errors;

a second counter for counting the number of times a counted value on said first counter exceeds a threshold number; and a third counter for counting a sync byte detect indicative of the head of said user data, wherein the counted value on said second counter is divided by a counted value on said third counter to find an interleaved event error rate.

5. A performance evaluation system comprising:

an error detector circuit for comparing user data stored in a memory with read data output from a read/write channel to detect errors;

an error interleaver for interleaving errors detected by said error detector circuit;

a first counter for counting said errors;

a second counter for counting the number of times a counted value on said first counter exceeds a threshold number;

a memory for storing said user data;

a distribution circuit for distributing errors detected by said error detector circuit into respective interleaves;

a setting circuit for setting said threshold for the number of errors per interleave, wherein said error interleaver interleaves errors distributed by said distribution circuit, wherein said first counter counts the errors interleaved by said error interleaver in a sector of said read data for each interleave, wherein said second counter counts an output value of said first counter exceeding said threshold number for each read data sector; and a third counter for counting a sync byte detect indicative of the head of said user data, wherein the counted value on said second counter is divided by a counted value on said third counter to find an interleaved event error rate.

6. An information storage apparatus comprising:

an information storage medium;

a head for reading/writing information from/on said information storage medium;

an actuator for moving said head over said information storage medium;

an amplifier for amplifying a read waveform read by said head;

a signal processing unit for decoding with error correction code from said read waveform;

an error detector for comparing read data outputted from said signal processing unit with user data stored in a memory to detect errors;

an error interleaver for interleaving errors detected by said error detector in two or more interleaves;

a first counter for counting errors per each of said interleaves;

a setting circuit for setting a threshold number per each of said interleaves; and a second counter for counting a number of instances in which the counted errors per each of said interleaves exceeds said threshold number.

* * * * *